United States Patent [19]
Jordan et al.

(10) Patent No.: US 6,527,038 B1
(45) Date of Patent: Mar. 4, 2003

(54) TOOLING PRODUCTION

(75) Inventors: Richard Michael Jordan, Oxon (GB); Allen Dennis Roche, Aberdare (GB)

(73) Assignee: Sprayform Holdings Limited, Swansea (GB)

( * ) Notice: Subject to any disclaimer, the term of this patent is extended or adjusted under 35 U.S.C. 154(b) by 0 days.

(21) Appl. No.: 09/339,731

(22) Filed: Jun. 24, 1999

(30) Foreign Application Priority Data

Jun. 26, 1998 (GB) .............................................. 9813801

(51) Int. Cl.$^7$ ................................................ B22D 23/00
(52) U.S. Cl. ........................................... 164/46; 164/19
(58) Field of Search ............................ 164/46, 19, 271

(56) References Cited

U.S. PATENT DOCUMENTS

| | | | |
|---|---|---|---|
| 4,549,597 A | 10/1985 | Hamamura | 164/35 |
| 4,726,412 A | 2/1988 | Magnan et al. | 29/527.2 |
| 5,189,781 A * | 3/1993 | Weiss et al. | 29/527.2 |
| 5,337,631 A * | 8/1994 | Singer et al. | 164/46 |

FOREIGN PATENT DOCUMENTS

| | | |
|---|---|---|
| EP | 0 794 265 A2 | 9/1997 |
| JP | 61061814 | 3/1986 |
| JP | 61291109 | 12/1986 |
| JP | 63286563 | 11/1988 |
| JP | 10235654 | 9/1998 |
| WO | 97/18074 | 5/1997 |

* cited by examiner

Primary Examiner—Tom Dunn
Assistant Examiner—I.-H. Lin
(74) Attorney, Agent, or Firm—Bliss McGlynn, P.C.

(57) ABSTRACT

A facsimile of article to be produced by tooling is laid in register with a first tooling part and sprayed metallic material is deposited over the first tooling part and the facsimile of the article in order to form a second tooling part. The first tooling part typically comprises a metallic material and portions of the first and second tooling parts bounding the article facsimile are typically in metal to metal contact with one another. The tooling parts are separated and the article facsimile removed.

40 Claims, 2 Drawing Sheets

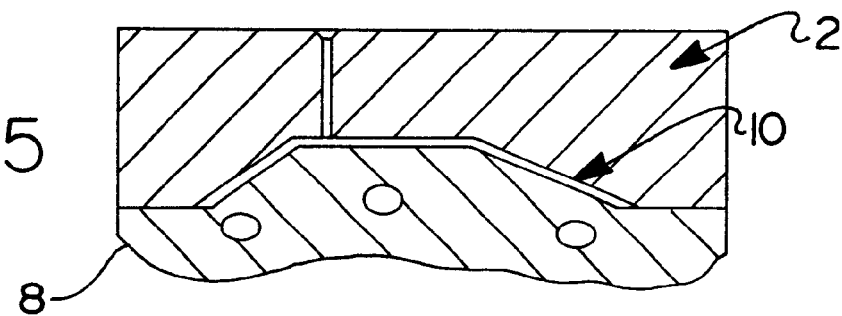
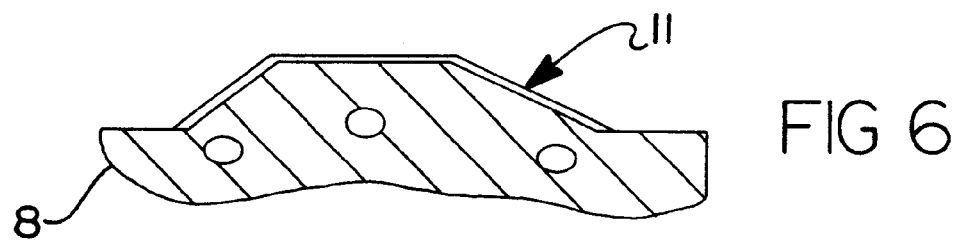
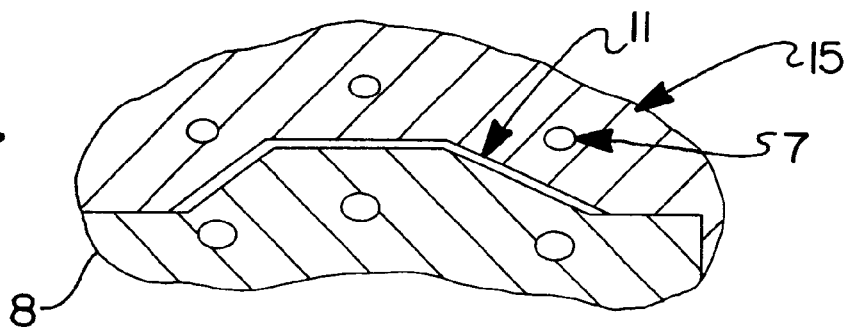

TOOLING PRODUCTION

FIELD OF THE INVENTION

The present invention relates to the manufacture of tooling (such as molds or dies) and in particular to the manufacture of tooling for use in casting, stamping and/or molding high volume production articles (such as plastics components).

BACKGROUND OF THE INVENTION

EP-A-0781625 discloses a technique for manufacturing tooling in which a ceramic model is formed to have a shape in the form of a component to be produced by the tooling. The ceramic model is used as the substrate upon which tool steel is sprayed to produce a tool steel mold for production purposes. The technique described may be used to form, separately, cooperating mold/die tooling parts which mate at an interface to define a mold cavity for production casting, plastics molding or other purposes. One disadvantage with the technique is that some degree of surface finishing (such as by grinding or lapping) of the mating surfaces of the mold/die parts is typically required in order to ensure accurate alignment of the mold/die parts.

An improved technique has now been devised.

SUMMARY OF THE INVENTION

According to a first aspect, the invention provides a process for the production of tooling (such as a mold or die) for manufacturing an article, the process comprising:

i) laying a facsimile of the article in register with a first tooling part,; and, ii) depositing sprayed metallic material over the first tooling part and the facsimile of the article in order to form a second tooling part.

Desirably the first tooling part comprises a metallic material (desirably having a metallic working surface), preferably formed by controlled deposition of sprayed molten metallic material.

The facsimile of the article in register with the first tooling part becomes embedded between the first and second tooling parts, portions of the first and second tooling parts bounding the article facsimile being in metal to metal contact with one another.

The process preferably further comprises separating the first and second tooling parts and also preferably removing the article facsimile from the first tooling part.

Desirably the article facsimile is adhered to the first tooling part prior to step ii).

The article facsimile may be introduced to the first tooling part in fluid form and subsequently cure/harden.

Desirably the article facsimile is cast onto the first tooling part according to step i). Preferably the article facsimile is cast into the first tooling part by vacuum casting. Desirably, the first tooling part is mated with a preliminary forming element enabling the article facsimile to be cast, the preliminary forming element is preferably subsequently removed to leave the article facsimile in register with the first tooling part. The preliminary forming element may for example comprise a negative of one hall of the article facsimile, and may be of a flexible material (facilitating subsequent removal following casting of the article facsimile). For example the preliminary forming element may comprise a silicone rubber mold part as known in the art and used in a variety of rapid prototyping techniques such as the so called 'vacuum casting' technique.

Desirably the article facsimile comprises a refractory material, preferably a ceramic material or freeze castable material. Advantageously, the refractory material is provided as a slurry which subsequently hardens when cast. Desirably, the process preferably includes a hardening procedure which for freeze casting may comprise a freezing stage (and also preferably a drying stage). Suitable materials for the article facsimile have been found to be materials such as dental stone and freeze castable ceramics such as alumina provided in a silica sol, which has been found to be particularly effective. Other suitable materials may, for example, be metal filled epoxy resins.

Ultimately, the first and second tooling parts cooperate to form a mold, tool or die for producing an article, such as for example a plastics component or the like. The first tooling part includes a negative impression of a first portion of the article; following step ii) of the process according to the invention, the second tooling part includes a negative impression of a second portion of the article.

The first tooling part is preferably obtained by depositing molten sprayed metallic material onto a substrate formed of refractory material which material may be the same as the material used to produce the article facsimile previously described.

Desirably, as a precursor, a preliminary mold (which may typically be of non-metallic, preferably flexible material, such as silicone rubber) is obtained having first and second mold parts corresponding to the first and second tooling parts of the metallic tooling. The preliminary mold may for example be a silicone rubber mold of a type use widely in the prototyping field for producing sample components by, for example, vacuum casting of plastics.

The second preliminary mold part is preferably the preliminary forming element with which the first metallic tooling part is mated when casting the article facsimile.

The first preliminary mold part is preferably used to make the first metallic tooling part advantageously by forming a substrate on the first preliminary mold part, the substrate desirably comprising a refractory material (preferably a freeze cast material). The substrate is then removed from the first preliminary mold part. The substrate so formed is then used to form the first metallic tooling part preferably by deposition of molten sprayed metallic material (as described above).

Following spray forming of the first metallic tooling part, the refractory substrate is removed by grit blasting or other suitable means. This provides a surface finish on the working surface of the first tooling part of sufficiently high quality to accept the sprayed metallic material from step ii) but provides a sufficiently clean boundary to enable the first and second tooling parts to be separated following( step ii). Aditionally or alternatively, mechanical separation techniques and/or certain release agents (such as suitable coatings) may be utilized.

The spraying of metallic material to form the first and second metallic tooling parts is preferably carried out using conventional metallurgical spraying apparatus, preferably where the spraying conditions and material are tailored to control stresses set up in the spray deposited metallic material. For example, WO-A-96/09421 discloses a technique of producing metallic articles by sprayforming wherein the conditions are tailored to ensure stress control.

It is preferred that in the sprayforming process action is taken to seal or infill interconnected porosity within the spray deposited first and second metallic tooling parts (particularly ensuring that porosity is sealed at the respective working surface of each mold part). WO-A-97/33012 discloses porosity reduction techniques which may be employed in accordance with the process described herein.

Furthermore, cooling channels may advantageously be incorporated in the first and/or second metallic spray deposited tooling part in order to permit cooling of the mold, thereby reducing the operating cycle time. WO-A-95/19859 discloses a technique for incorporating cooling channels into sprayed metallic deposited material.

BRIEF DESCRIPTION OF THE DRAWINGS

The invention will now be further described in specific embodiments by way of example only, and with reference to the accompanying drawings in which:

As shown in FIG. 1 the mold 1 comprises a mold cavity 2 and a mold core 3 having a void space there between defining the shape of the prototype component 4. The standard casting technique for casting prototype components in a mold as shown in FIG. 1 is the so-called vacuum casting technique in which colored resins are poured into the silicone rubber mold 1 under vacuum via a combined mixing and pouring chamber throgh entry point 5. The vacuum is then relieved to atmospheric pressure whereupon the silicone mold cavity 4 fills with resin which is then allowed to cure inside the mold prior to extraction.

Figure 1:
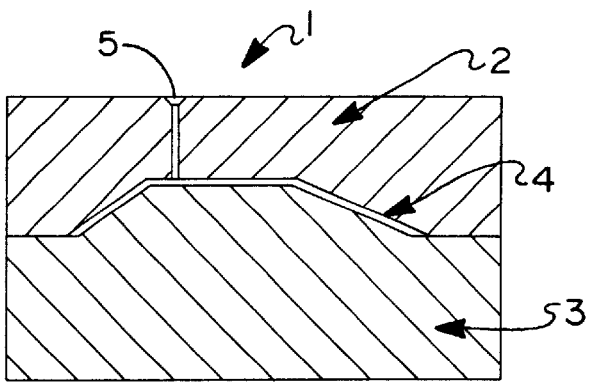
FIG. 1 discloses a prior art silicone rubber mold.

One advantage of the present invention is that it enables a prototyping mold such as that shown in FIG. 1 to be used for producing tooling in the form of production molds for high volume mass production of components.

Figure 2:
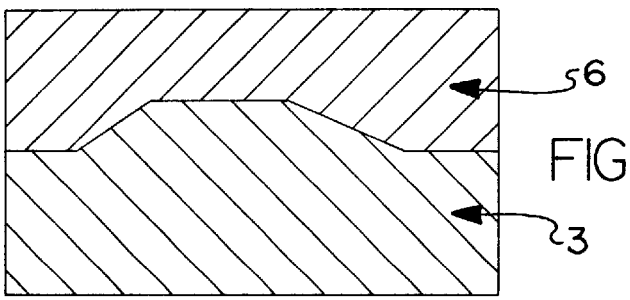
FIG. 2 discloses an initial stage in the production of a mold in accordance with the invention; and, FIGS. 3 to 7 disclose subsequent stages in reproduction of a mold in accordance with the invention; and Referring to the drawings and initially to FIG. 1, a preliminary silicone rubber mold 1 is formed in two parts 2,3 about a prototype product/component 4 which may be generated from CAD file in suitable material by a stereolithographic (SLA) technique (as described, for example, in EP-A-0781625). The prototype product/component has dimensions selected to compensate for any thermal or other shrinkage that may occur during subsequent procedures.

As shown in FIG. 2, the rubber core mold part 3 is used to generate a refractory substrate 6 which is a negative of the rubber core mold part 3. The refractory material forming the negative substrate 6 is cast using a sillica sol and alumina slurry which is poured onto the silicone rubber core under vacuum conditions. The cast substrate 6 is then subjected to a freezing stage at temperatures between −2° C. to −40° C. for a predetermined period (typically for several hours). Subsequently the freeze-cast substrate 6 is separated from the silicone rubber core. This process, in general terms, is know from prior art production techniques and is described, for example, in EP-A-0781625.

Figure 3:
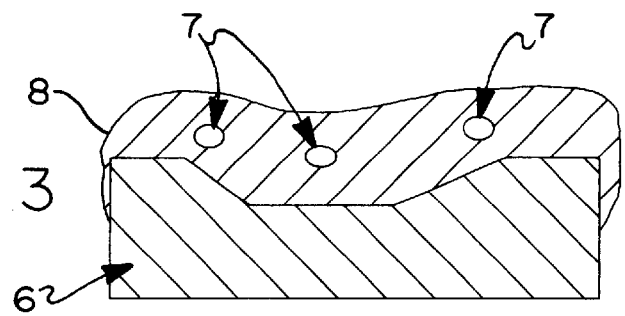

Referring to FIG. 3 the freeze-cast substrate 6 is subsequently sprayed with molten steel to produce one half of the final steel tooling (the 'first' mold part 8). In this procedure, the spraying conditions are tailored to control stresses set up in the deposited steel, cooling channels 7 are formed in the deposited steel and action taken to minimize interconnected porosity in the steel deposited mold part 8. Examples of appropriate spraying parameters for the steel and techniques for controlling stresses, reducing porosity and production of cooling channels are described in WO-A-96/09421, WO-A-97/33012 and WO-A-95/19859.

Subsequently the freeze-cast substrate 6 is removed from sprayed steel mold part 8 by means of bead blasting using fresh non-contaminating steel shot at low blasting pressures (approximately 25 psi). This provides sufficiently high quality surface finish on the working surface 9 of the steel mold part 8 to ensure separation of further deposited material later in the process (described hereafter).

Figure 4:
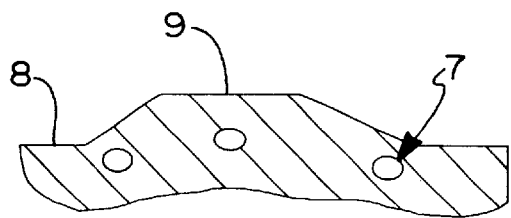

When the refractory substrate 6 has been entirely removed from the working surface 9, the steel mold part 8 is in the condition shown in FIG. 4. Subsequently, the silicone rubber cavity mold part 2 is mated with the sprayed steel mold part 8 such that a mold space 10 (conforming to the configuration of the component to be produced) is left between the working surfaces of the respective mold parts 8 and 2. Ceramic slurry in the form of a sillica sol and alumina slurry is then poured through inlet 5 under vacuum to be injected into the space 10. The slurry in the mold is then freeze-gelated in the same manner as freeze-gelation of the freeze-cast ceramic substrate 6 described above.

The mold parts 8 and 2 are then separated leaving a freezed-cast facsimile of the component to be manufactured 11 firmly adhered to the steel mold part 8. The refactory ceramic freeze-cast component facsimile 11 is then dried on the steel mold part 8 in an oven at 200° C.

Following this stage steel is spray deposited on the metal core part 8 with the freeze-cast refractory component facsimile 11 remaining in place to form a spray deposited steel cavity mold part 15. The steel mold parts 15 and 8 are next separated and the parting surface of the sprayed metal core mold part 8 is blasted with fresh non-contaminated steel shot at low blasting pressures (approximately 25 psi) to remove the freeze-cast refractory component facsimile 11 without causing damage to the working surface of the sprayed metal core mold part 8.

The respective separated steel sprayed mold parts 7 and 15 are then ready for bolstering to be used as full production tooling for high volumn production.

Because the two mold halves are prepared by spraying one onto the other, the parting surfaces are matched highly accurately and there is minimal requirement to further treat the operating surfaces of the mold (by flashing, lapping or grinding) to ensure accurate matching up of the two mold halves.

The technique furthermore eliminates the need to produce a freeze-cast substrate for each half of the mold (as has been the case for a known prior art technique), instead it is simply necessary to produce a freeze-cast substrate of one half of the mold and then a freeze-cast facsimile of the component to be eventually manufactured by the tooling.

What is claimed is:

1. A process for the production of tooling for manufacturing an article, the process including the steps of:
    i) forming a facsimile of the article on a first working surface of a first tooling part; and
    ii) depositing sprayed metallic material over the first tooling part and the facsimile of the article to form a second tooling part having a second working surface adapted to cooperate with the first working surface for producing the article therebetween.

2. A process according to claim 1, wherein the first working surface is a metallic working surface.

3. A process according to claim 1, wherein the first tooling part comprises a metallic material.

4. A process according to claim 3, wherein the first tooling part is formed by a process including controlled deposition of sprayed molten metallic material.

5. A process according to claim 3, wherein the facsimile of the article in register with the first tooling part becomes embedded between the first and second tooling parts, portions of the first and second tooling parts bounding the article facsimile being in metal to metal contact with one another.

6. A process according to claim 1 further including separating the first and second tooling parts.

7. A process according to claim 1 further including removing the article facsimile from the first tooling part.

8. A process according to claim 1, wherein the article facsimile is adhered to the first tooling part prior to step ii).

9. A process according to claim 1, wherein the article facsimile is introduced to the first tooling part as material in fluid form and subsequently cures/hardens.

10. A process according to claim 1, wherein the article facsimile is cast onto the first tooling part according to step i).

11. A process according to claim 10, wherein the article facsimile is cast into the first tooling part by vacuum casting.

12. A process according to claim 10, wherein the first tooling part is mated with a preliminary forming element enabling the article facsimile to be cast.

13. A process according to claim 12, wherein the preliminary forming element is subsequently removed to leave the article facsimile in register with the first tooling part.

14. A process according to claim 12, wherein the preliminary forming element comprises a negative of a portion of the article facsimile.

15. A process according to claim 12, wherein the preliminary forming element comprises a flexible material.

16. A process according to claim 15, wherein the preliminary forming element comprises a silicone rubber mold.

17. A process according to claim 1, wherein the article facsimile comprises a refractory material.

18. A process according to claim 17, wherein the article facsimile comprises a ceramic material or freeze castable material.

19. A process according to claim 17, wherein the refractory material is provided as a slurry which subsequently hardens when cast.

20. A process according to claim 1, further including a step of hardening the facsimile of the article.

21. A process according to claim 20, wherein the hardening step occurs with the facsimile in register with the first tooling part.

22. A process according to claim 20, wherein the hardening step comprises freezing the article facsimile.

23. A process according to claim 1, further including a step of drying the facsimile of the article.

24. A process according to claim 1, wherein the first and second tooling parts are separated following step ii).

25. A process according to claim 1, wherein the article facsimile is removed from register with the first tooling part following step ii).

26. A process according to claim 25, wherein the article facsimile is removed from register with the first tooling part following step ii), by means of an abrasive process.

27. A process according to claim 26, wherein article facsimile is removed from register with the first tooling part following step ii), by means of a relatively low pressure blasting technique.

28. A process according to claim 1, wherein the first and second tooling parts are separated following step ii), the article facsimile subsequently being removed from register with the first tooling part.

29. A process according to claim 1, wherein the first tooling part includes a negative impression of a first portion of an article and, following step ii) the second tooling part includes a negative impression of a second portion of an article.

30. A process according to claim 1, wherein the first tooling part is obtained by depositing molten sprayed metallic material onto a substrate formed of refractory material.

31. A process according to claim 1, wherein, as a precursor to step i), a preliminary mold is obtained having first and second mold parts corresponding to the first and second tooling parts of the metallic tooling.

32. A process according to claim 31, wherein the preliminary mold parts comprise flexible material.

33. A process according to claim 31, wherein one of the preliminary mold parts is used to make the first metallic tooling part by:

i) forming a substrate on the preliminary mold part;

ii) removing the substrate from the preliminary mold part; and, iii) depositing sprayed molten metallic material on the substrate.

34. A process according to claim 33, wherein the substrate comprises a refractory material.

35. A process according to claim 33, wherein following the deposition of sprayed metal thereon, the substrate is removed from the first tooling part.

36. A process according to claim 35, wherein the substrate is removed from the first tooling part by means of grit blasting.

37. A process according to claim 1, wherein the spraying of metallic material to form at least one of the first and second metallic tooling parts is adjusted to control stresses set up in the spray deposited metallic material.

38. A process according to claim 1, including forming interconnected porosity within at least one of the spray deposited first metallic tooling part and the spray deposited second metallic tooling parts is in-filled or sealed, by a process step following step ii).

39. A process according to claim 1, including forming cooling channels in at least one of the first metallic spray deposited tooling part and the second metallic spray deposited tooling part in order to permit cooling of the respective tooling part.

40. A method of making tooling for manufacturing an article comprising the steps of:

forming a first tooling part having a first working surface;

mating the first tooling part with a mold part to form a mold space conforming to a configuration of the article;

depositing a ceramic material into the mold space to form a facsimile of the article on the first working surface;

separating the mold part from the first tooling part and firmly adhering the facsimile to the first tooling part; and depositing sprayed metallic material over the first tooling part and the facsimile of the article to form a second tooling part having a second working surface adapted to cooperate with the first working surface for producing the article therebetween.

* * * * *